United States Patent
Yamaguchi

(10) Patent No.: US 11,451,685 B2
(45) Date of Patent: Sep. 20, 2022

(54) COLOR CONVERSION TABLE CORRECTOR THAT CORRECTS THE COLOR CONVERSION TABLE ACCORDING TO DATA RELATED TO A FIRST CAPTURED IMAGE EXCLUDING A SPECIFIED AREA

(71) Applicant: Konica Minolta, Inc., Tokyo (JP)

(72) Inventor: Takeshi Yamaguchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/008,717

(22) Filed: Sep. 1, 2020

(65) Prior Publication Data
US 2021/0084195 A1 Mar. 18, 2021

(30) Foreign Application Priority Data
Sep. 13, 2019 (JP) .............................. JP2019-167352

(51) Int. Cl.
*H04N 1/60* (2006.01)
*H04N 1/00* (2006.01)

(52) U.S. Cl.
CPC ....... *H04N 1/6002* (2013.01); *H04N 1/00005* (2013.01); *H04N 1/0044* (2013.01)

(58) Field of Classification Search
CPC ............... H04N 1/6002; H04N 1/0044; H04N 1/00005; H04N 1/603; H04N 1/6072
See application file for complete search history.

(56) References Cited

U.S. PATENT DOCUMENTS 10,284,749 B2 * 5/2019 Yamaguchi .......... H04N 1/6008
2020/0404125 A1 * 12/2020 Oya ..................... H04N 1/6072

FOREIGN PATENT DOCUMENTS

JP 2014093574 A 5/2014

* cited by examiner

*Primary Examiner* — Christopher Wait
(74) *Attorney, Agent, or Firm* — Buchanan Ingersoll & Rooney PC

(57) ABSTRACT

A color conversion table corrector corrects a color conversion table used in an image data generation device, and the color conversion table corrector includes a hardware processor that: obtains data related to a print image; obtains first target data based on a first captured image obtained by capturing an image of a first color matching target corresponding to the print image; decides a specific area, in the first captured image, which is not used to correct the color conversion table; and corrects the color conversion table according to the data related to the print image and the first target data based on the first captured image excluding the specific area.

8 Claims, 10 Drawing Sheets

FIG. 6

| REPRESENTATIVE COLOR | | | | BEFORE CORRECTION | | | AFTER CORRECTION | | | CORRECTION AMOUNT | | |
|---|---|---|---|---|---|---|---|---|---|---|---|---|
| C | M | Y | K | $L^*$ | $a^*$ | $b^*$ | $L^{*'}$ | $a^{*'}$ | $b^{*'}$ | $\Delta L^*$ | $\Delta a^*$ | $\Delta b^*$ |
| $C_1$ | $M_1$ | $Y_1$ | $K_1$ | $L^*_1$ | $a^*_1$ | $b^*_1$ | $L^{*'}_1$ | $a^{*'}_1$ | $b^{*'}_1$ | $\Delta L^*_1$ | $\Delta a^*_1$ | $\Delta b^*_1$ |
| .... | .... | .... | .... | .... | .... | .... | .... | .... | .... | .... | .... | .... |
| $C_n$ | $M_n$ | $Y_n$ | $K_n$ | $L^*_n$ | $a^*_n$ | $b^*_n$ | $L^{*'}_n$ | $a^{*'}_n$ | $b^{*'}_n$ | $\Delta L^*_n$ | $\Delta a^*_n$ | $\Delta b^*_n$ |

COLOR CONVERSION TABLE CORRECTOR THAT CORRECTS THE COLOR CONVERSION TABLE ACCORDING TO DATA RELATED TO A FIRST CAPTURED IMAGE EXCLUDING A SPECIFIED AREA

The entire disclosure of Japanese patent Application No. 2019-167352, filed on Sep. 13, 2019, is incorporated herein by reference in its entirety.

BACKGROUND

Technological Field

The present invention relates to a color conversion table corrector, a color conversion table correction program, and a color conversion table correction method.

Description of the Related Art

The image forming apparatus may have different color characteristics in formed images, depending on the model. Therefore, the color reproducibility of an image of print data is guaranteed in the formed image by converting a device value (CMYK value, etc.) of the print data to be printed into a device value corresponding to the model according to a color conversion table for each model.

On the other hand, a customer may request color matching using a color sample. In this case, the customer provides the print data and a color sample for color matching of the print data. However, for a color such as a corporate color for which color reproducibility is particularly required, there is a case where the color sample is not the color desired by the customer. In this case, even when the color conversion table is corrected to ensure the color reproducibility of the color sample, the corporate color or the like in the formed image is not the color desired by the customer, and the color reproducibility may be further reduced by the correction.

JP 2014-93574 A discloses a following technique. The image of a specific figure such as a logo mark is saved in advance. When an image is formed, a specific image that matches the stored image is detected from the data of the image formation target by pattern matching. Then, color conversion is performed on images other than the specific image using the color conversion table, color conversion is performed on the specific image using the color conversion table edited for the specific image, and an image is formed based on the converted data.

However, the above-mentioned prior art has a problem that productivity is reduced because the specific image has to be detected by patient matching every time an image is formed.

SUMMARY

The present invention has been made to solve such a problem. In other words, there is an object to provide a color conversion table corrector, a color conversion table correction program, and a color conversion table correction method that suppresses reduction in color reproducibility without reducing productivity.

To achieve the abovementioned object, according to an aspect of the present invention, there is provided a color conversion table corrector that corrects a color conversion table used in an image data generation device, and the color conversion table corrector reflecting one aspect of the present invention comprises: a hardware processor that: obtains data related to a print image; obtains first target data based on a first captured image obtained by capturing an image of a first color matching target corresponding to the print image; decides a specific area, in the first captured image, which is not used to correct the color conversion table; and corrects the color conversion table according to the data related to the print image and the first target data based on the first captured image excluding the specific area.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is an explanatory diagram illustrating a data structure before and after correction of a source profile;

DETAILED DESCRIPTION OF EMBODIMENTS

Figure 1:
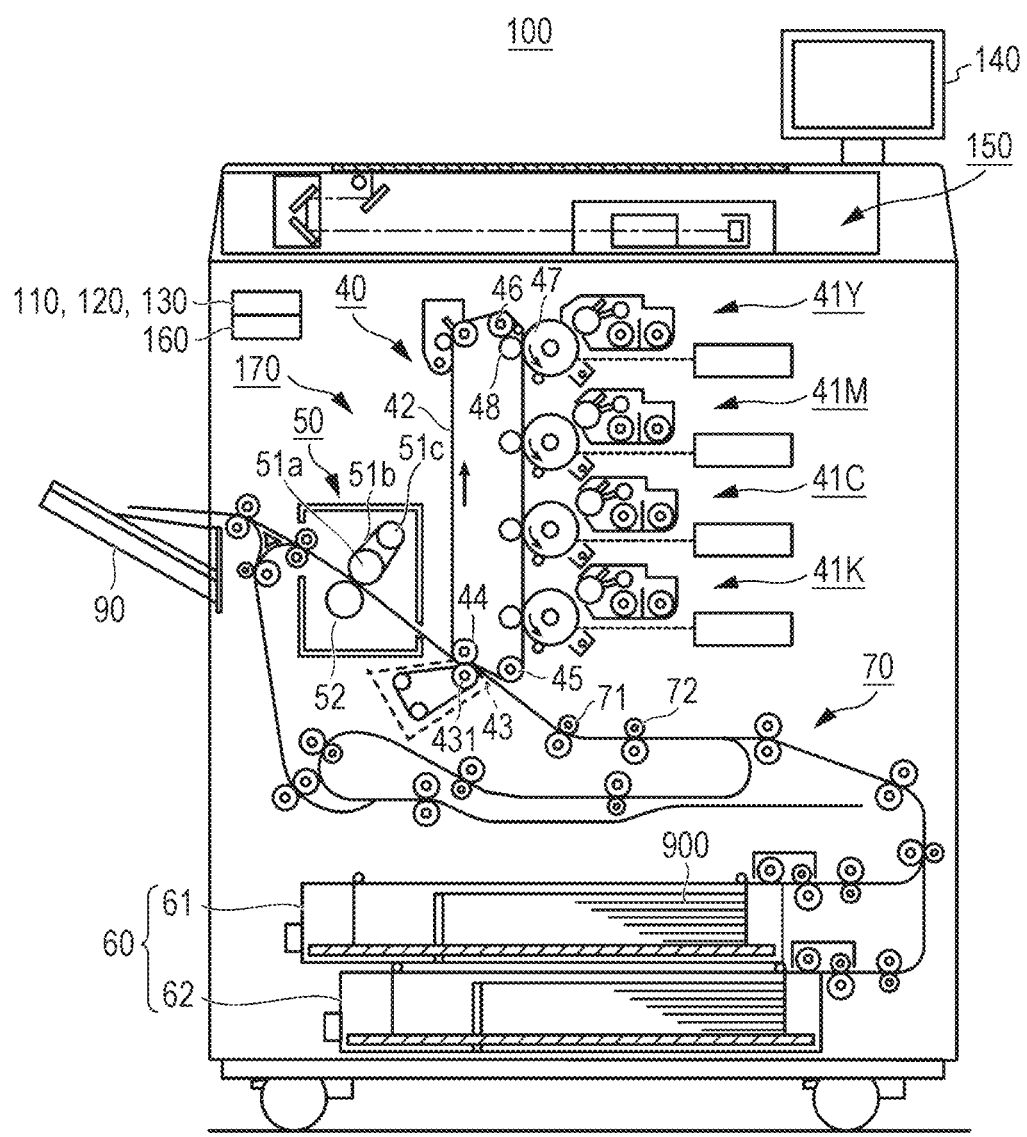
FIG. 1 is a schematic diagram illustrating a configuration of an image forming apparatus.

Hereinafter, an image forming apparatus according to one or more embodiments of the present invention will be described with reference to the drawings. However, the scope of the invention is not limited to the disclosed embodiments. The same elements are denoted by the same reference numerals in the drawings, and overlapping description will be omitted. Further, the dimensional ratios in the drawings are exaggerated for convenience of description, and may differ from the actual ratios.

Figure 2:
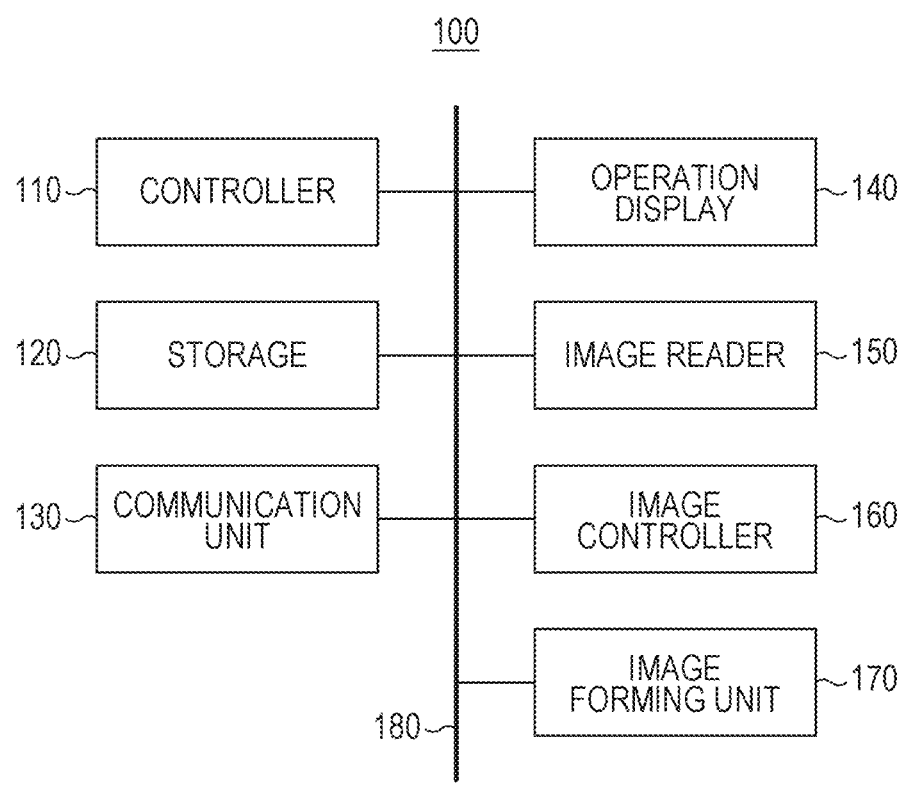
FIG. 2 is a block diagram illustrating a configuration of the image forming apparatus.

FIG. 1 is a schematic diagram illustrating a configuration of an image forming apparatus 100. FIG. 2 is a block diagram illustrating the configuration of the image forming apparatus 100.

The image forming apparatus 100 can be connected to one or more terminals (not illustrated) that give various instructions such as a print instruction to the image forming apparatus 100 via a communication unit 130 through a network. The image forming apparatus 100 forms an image on a sheet 900 based on a print job received from the terminal.

The print job is a general term for print commands to the image forming apparatus 100, and includes print data and print settings. The print data is data of a document to be printed, and the print data may include various data such as picture data, vector data, and text data. Specifically, the print data may be portable document format (PDF) data, page description language (PDL) data, or tagged image file format (TIFF) data. The print settings are settings relating to image formation on the sheet 900, and include, for example, various settings such as the number of pages, the number of print copies, a paper type, color or monochrome selection, and a page layout.

The image forming apparatus 100 includes a controller 110, a storage 120, the communication unit 130, an operation display 140, an image reader 150, an image controller 160, and an image forming unit 170. These components are communicatively coupled to each other by a bus 180. The image forming apparatus 100 can be configured by, for example, a multi function peripheral (MFP).

The controller 110 includes a central processing unit (CPU) and various memories, controls various parts described above, and performs various arithmetic processes according to a program. The controller 110 constitutes a color conversion table corrector. The controller 110 also constitutes a first obtainer, a second obtainer, a third obtainer, a decider, a corrector, and a determiner. Note that the color conversion table corrector may be configured by a terminal (not illustrated) that is communicably connected to the image forming apparatus 100 via the communication unit 130. Details of the operation of the controller 110 will be described later.

The storage 120 is configured by a solid state drive (SDD), a hard disc drive (HDD), or the like, and stores various programs and various data.

The communication unit 130 is an interface for communication between the image forming apparatus 100 and an external device. As the communication unit 130, a network interface according to standards such as Ethernet (registered trademark), SATA, and IEEE1394 is used. As the communication unit 130, various local connection interfaces such as a wireless communication interface including Bluetooth (registered trademark) and IEEE 802.11 are used.

The operation display 140 includes a touch panel, a numeric keypad, a start button, a stop button, and the like, and is used for displaying various information and inputting various instructions.

The image reader 150 has a light source such as a fluorescent lamp and an image sensor such as a charge coupled device (CCD) image sensor, the image reader 150 applies light from a light source to a document set at a predetermined reading position, photoelectrically converts the reflected light by the image sensor, and generates image data (captured image) from electric signals.

The image controller 160 performs layout processing, screening, rasterization processing, and the like of print data included in the print job and the like, which is received by the communication unit 130, and generates image data in a bitmap format. The image data is a CMYK value or an RGB value for each pixel. The image controller 160 constitutes an image data generation device.

The image controller 160 ensures color reproducibility of the image of the print data included in the print job in the image formed by the image for unit 170, by performing color conversion on the image data according to a color conversion table.

Figure 3:
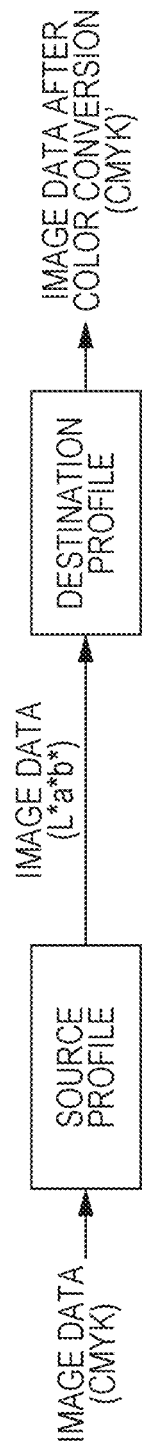
FIG. 3 is a diagram illustrating an example of a color conversion table.

FIG. 3 is a diagram illustrating an example of the color conversion table. The color conversion table is also called a profile. The color conversion table is, for example, an ICC profile. The ICC profile includes a device profile and a device link profile. Hereinafter, in order to simplify the description, the color conversion table will be described as a device profile.

The image data is converted from a CMYK value (or an RGB value), which is a model (device) dependent value, into a model-independent $L^*a^*b^*$ value (or an XYZ value) according to a source profile. In the following, for simplicity of explanation, the source profile is described as what converts CMYK values into $L^*a^*b^*$ values. The source profile is composed of a lookup table (LUT) for converting CMYK values to $L^*a^*b^*$ values. As the source profile, for example, a standard profile such as Japan Color can be used. The image data is converted into $L^*a^*b^*$ values independent of the model, and then converted into CMYK values ((CMYK)' after conversion) according to a destination profile. The destination profile is composed of LUTs for converting $L^*a^*b^*$ values to CMYK values. The destination profile is provided for each model of the image forming unit 170, which is a printer, and is selected for each model. The destination profile converts the model-independent $L^*a^*b^*$ value to the model-dependent CMYK value, thus ensuring printer-independent color reproducibility.

Each LUT of the source profile and the destination profile that constitutes the device profile may be a LUT for a representative color. The definition of the representative color and the interpolation method for the colors between the representative colors are defined as the specifications of the ICC profile.

The image controller 160 may be configured by a controller separate from the image forming apparatus 100. In that case, the image forming apparatus 100 and the controller may be connected by a dedicated line using a peripheral component interconnect (PCI) connection or the like.

The image forming unit 170 includes an imaging section 40, a fixing unit 50, a sheet feeding unit 60, and a sheet conveyer 70.

The imaging section 40 includes imaging units 41Y, 41M, 41C, and 41K corresponding to toners of Y (yellow), M (magenta), C (cyan), and K (black), respectively. The imaging units 41Y, 41M, 41C, and 41K form a toner image on a photosensitive drum 47 through a process of charging, exposing, and developing based on the image data (image data after color conversion). The exposure is performed by scanning on the photosensitive drum 47 with a laser beam. The toner image formed on the photosensitive drum 47, which is an image carrier, is pressed against the photosensitive drum 47 and a primary transfer roller 48 via an intermediate transfer belt 42, and driving force of a driving roller 45 causes the intermediate transfer belt 42 to rotate and move to sequentially form a color toner image on the intermediate transfer belt 42. The intermediate transfer belt 42 runs in a sub-scanning direction (the direction of the straight arrow). The color toner image formed on the intermediate transfer belt 42 is transferred onto the conveyed sheet 900 by a secondary transfer roller 431 and a counter roller 44 being pressed against each other via the intermediate transfer belt 42.

The fixing unit 50 includes a fixing roller 51a and a pressure roller 52, and the fixing roller 51a and the pressure roller 52 are pressed against each other via the fixing belt 51b, so that a fixing nip N is formed between the fixing belt 51b and the pressure roller 52. The fixing roller 51a and the pressure roller 52 are heated to a predetermined temperature by a heater incorporated therein. The sheet 900 conveyed to the fixing unit 50 is heated and pressed in the fixing nip to fix (melt and fix) the toner image, and is also conveyed by rotation of the fixing roller 51a and the pressure roller 52.

The sheet 900 on which the toner image is fixed by the fixing unit 50 is discharged to a sheet discharge tray 90 as a printed matter.

The sheet feeding unit 60 has a plurality of sheet feeding trays 61 and 62, and feeds the sheets 900 accommodated it) the sheet feeding trays 61 and 62 one by one to a downstream conveyance path.

The sheet conveyer 70 has a plurality of conveyance rollers for conveying the sheet 900, and conveys the sheet 900 through the imaging section 40, the fixing unit 50, and the sheet feeding unit 60. The plurality of conveyance rollers include a registration roller 71 for correcting the inclination of the sheet 900 and a loop roller 72 for forming a predetermined amount of loops on the sheet 900.

The sheet conveyer 70 discharges the sheet 900 on which an image has been formed to the sheet discharge tray 90.

Next, the operation of the controller 110 will be described in detail.

The controller 110 uses the print data for color matching (PDF data, etc.), and a color matching target of a print sample (hereinafter, referred to as a "first color matching target 10" (see FIG. 4, etc.)) to perform color matching to correct the color conversion table (more specifically, correct the source profile of the color conversion table (the same applies below)). The controller 110 obtains target data (hereinafter, referred to as "first target data") by converting a captured image (hereinafter, referred to as a "first captured image") obtained by scanning (capturing) the first color matching target by the image reader 150 into an L*a*b* value using a scanner profile or the like. The first captured image may be a captured image of the first color matching target captured by a digital camera or the like. The controller 110 determines a specific area, in the first captured image, which is not used for correcting the color conversion table. The specific area is determined, for example, based on the specification of the specific area received from a user on the operation display 140. The specific area is an area of a color for which color matching accuracy is particularly required, and may be, for example, a corporate color area such as a logo mark in the first captured image. The controller 110 obtains print image related data (data related to the print image) by converting the print data for color matching into image data (CMYK values for each pixel) by rasterizing in the image controller 160 and then converting the data into L*a*b* values according to the source profile. The print image related data is colorimetric value data corresponding to the image (print image) formed on the basis of the print data. The controller 110 corrects the source profile of the color conversion table based on the print image related data and the first target data obtained by converting the first captured image excluding the specific area. The controller 110 does not correct the color conversion table based on the color of the specific area in the first captured image. Since the color conversion table is not corrected for the color corresponding to the specific area, the color conversion table remains in an original state (standard profile such as Japan Color). As a result, when the first color matching target is the color desired by the customer in the area other than the specific area but is not the color desired by the customer in the specific area, a decrease in color reproducibility due to the correction of the color conversion table based on the first color matching target can be prevented.

As will be described later, for the color corresponding to the specific area, the color conversion table can be corrected based on another piece of target data (hereinafter, referred to as "second target data") related to the color of another color matching target (hereinafter, referred to as a "second color matching target"). The second target data regarding the color of the second color matching target is the colorimetric value (for example, alt L*a*b* value) of the second color matching target. The second target data is obtained by converting a captured image (hereinafter, referred to as a "second captured image") obtained by scanning the second color matching target in the image reader 150 into L*a*b* values using the scanner profile. The second target data may be obtained by measuring the color of the second color matching target with a colorimeter. For the color corresponding to the specific area, by correcting the color conversion table based on the second target data related to the color of the second color matching target, the color reproducibility of the specific area can be improved based on the second color matching target in a case where the first color matching target is the color desired by the customer in the area other than the specific area but not the color desired by the customer in the specific area.

The corrected color conversion table can be stored in the storage 120.

Figure 4:
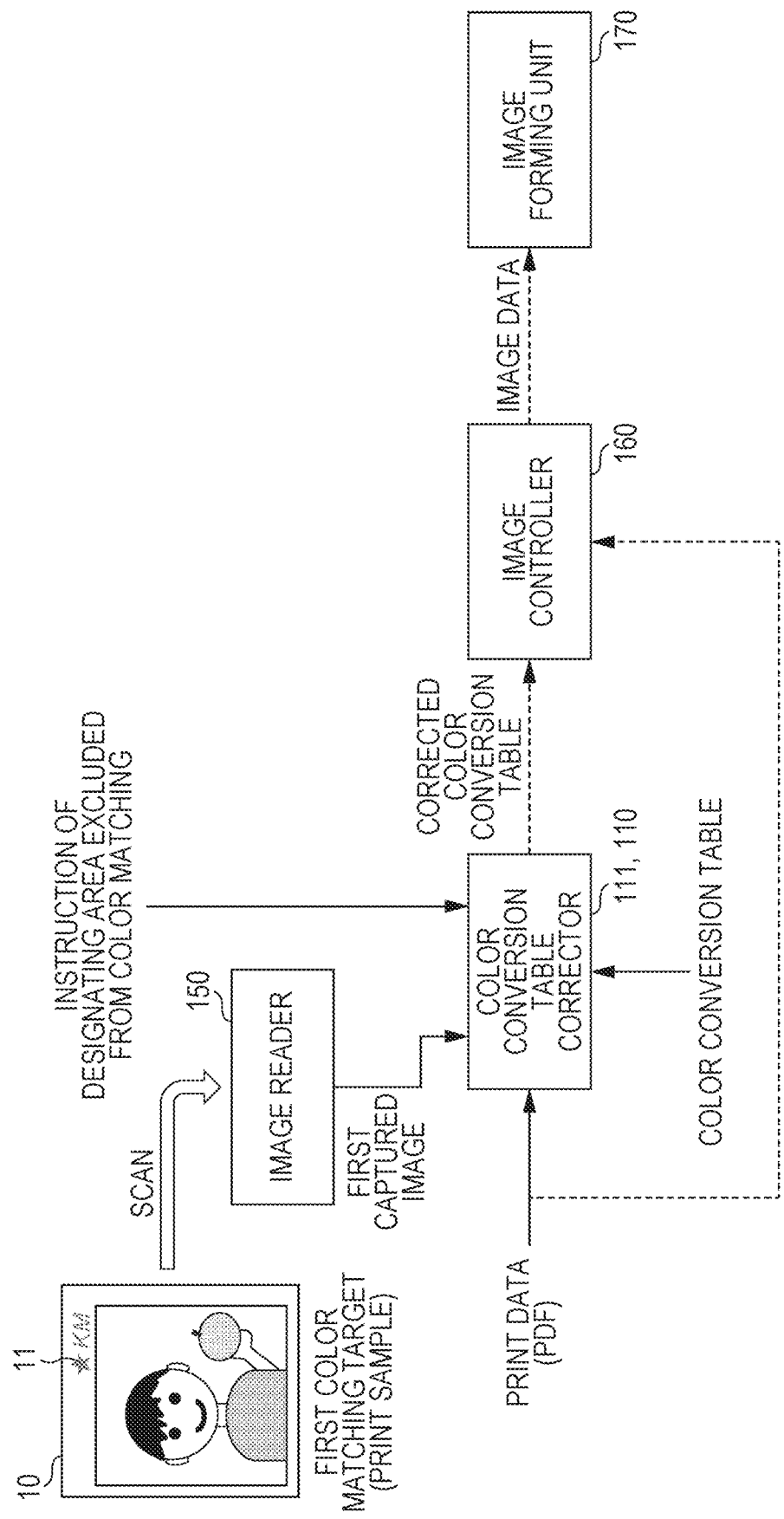
FIG. 4 is a block diagram illustrating an example of function of a controller when correcting be color conversion table.

FIG. 4 is a block diagram illustrating an example of functions of the controller 110 in a case of correcting the color conversion table. In FIG. 4, the image reader 150, the image controller 160, and the image forming unit 170 are also illustrated for the sake of simplicity. In the example of FIG. 4, a print sample including an image of a person, which is the first color matching target 10, includes a star and letters "KM" as a corporate color logo mark 11, which is the specific area.

When correcting the color conversion table, the controller 110 functions as the color conversion table corrector 111. The color conversion table corrector 111 determines the specific area in the first captured image obtained by scanning the first color matching target 10 by the image reader 150, based on the instruction to designate the specific area. The color conversion table corrector 111 reads the color conversion table from the storage 120. The color conversion table corrector 111 obtains first target data (an L*a*b* value) by converting the first captured image into an L*a*b* value according to a scanner profile or the like. The color conversion table corrector 111 obtains pint image related data (an L*a*b* value) by converting the print data for color matching (for example, PDF data) into image data by rasterizing in the image controller 160, and then, converting the data into an L*a*b* value according to the source profile of the color conversion table for example. The color conversion table corrector 111 corrects the color conversion table based on the print image related data and the first target data obtained by converting the first captured image excluding the specific area.

Figure 5:
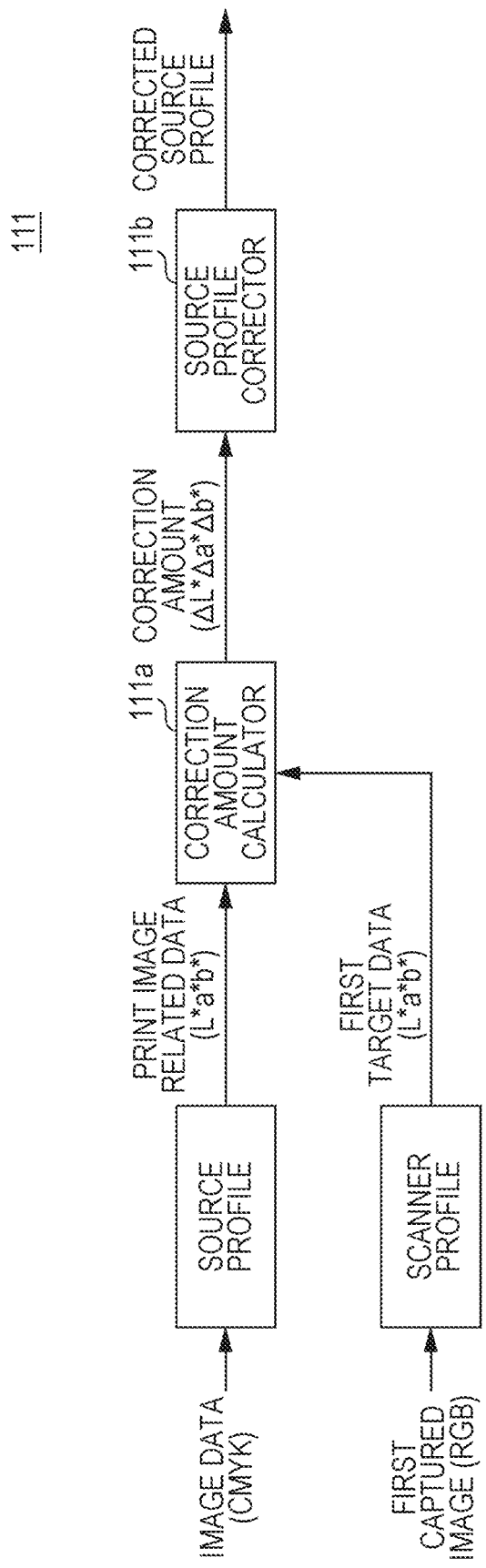
FIG. 5 is a block diagram illustrating a example of functions of a color conversion table corrector.

Correction of the color conversion table will be described in more detail with reference to FIGS. 5 and 6. FIG. 5 is a block diagram illustrating a example of the function of the color conversion table corrector. FIG. 6 is an explanatory diagram illustrating the data structure before and after the correction of the source profile.

As illustrated in FIG. 5, the color conversion table corrector 111 includes a correction amount calculator 111a and a source profile corrector 111b.

The correction amount calculator 111a obtains print image related data (an L*a*b* value) by converting the image data (CMYK values) obtained by rasterizing the print data for color matching into L*a*b* values according to the source profile. The correction amount calculator 111a obtains the first target data (an L*a*b* value) by converting the first captured image (an RGB value) into an L*a*b* value according to the scanner profile or the like. The correction amount calculator 111a calculates a difference between the print image related data (L*a*b* value) and time first target data (L*a*b* value) as a correction amount (ΔL*, Δa*, Δb*), regarding the representative color among the colors of the first target data based on the first captured image excluding the specific area. The representative color is one or more colors.

The source profile corrector 111b corrects the color conversion table based on the correction amount (ΔL*, Δa*, Δb*). Specifically, the source profile of the color conversion table can be corrected by adding the correction amount (ΔL*, Δa*, Δb*) to the L*a*b* value before correction. Note that, in the correction of the source profile, not only the points (grid) of the representative color corresponding to the color of the target data but also the adjacent points are corrected within a certain range, so that the occurrence of tone jump can be reduced. The points that are affected by a plurality of points may be averaged or the like to prevent extreme correction. Alternatively, smoothing may be performed by calculating a moving average or the like of all points.

In the example of FIG. 6, the source profile before correction is presented as an LUT indicating the correspondence relationship between CMYK, values ($C_n$, $M_n$, $K_n$) and L*a*b* values before correction ($L^*_n, a^*_n, b^*_n$) for each representative color. The L*a*b* values ($L^*_n, a^*_n, b^*_n$) before correction are values corresponding to the CMYK values in a standard profile such as Japan Color, for example. In addition, the source profile before correction is presented as an LUT indicating correspondence relationship between CMYK values ($C_n$, $M_n$, $Y_n$, $K_n$) and L*a*b* values ($L^{*\prime}_n, a^{*\prime}_n, b^{*\prime}_n$) after correction for each representative color. Also, the correction amount (ΔL*, Δa*, Δb*), which is the difference between the L*a*b* value before correction ($L^*_n, a^*_n, b^*_n$) and the L*a*b* value after correction ($L^{*\prime}_n, a^{*\prime}_n, b^{*\prime}_n$), is also presented.

At the time of image formation, the image controller 160 reads the corrected color conversion table from time storage 120, as indicated by the arrow of the dashed line in FIG. 4. The print data included in the print job is converted to image data by being rasterized in the image controller 160, and then color-converted according to the corrected color conversion table. An image is formed on the sheet 900 by the image forming unit 170 based on the image data after the color conversion.

Figure 7:
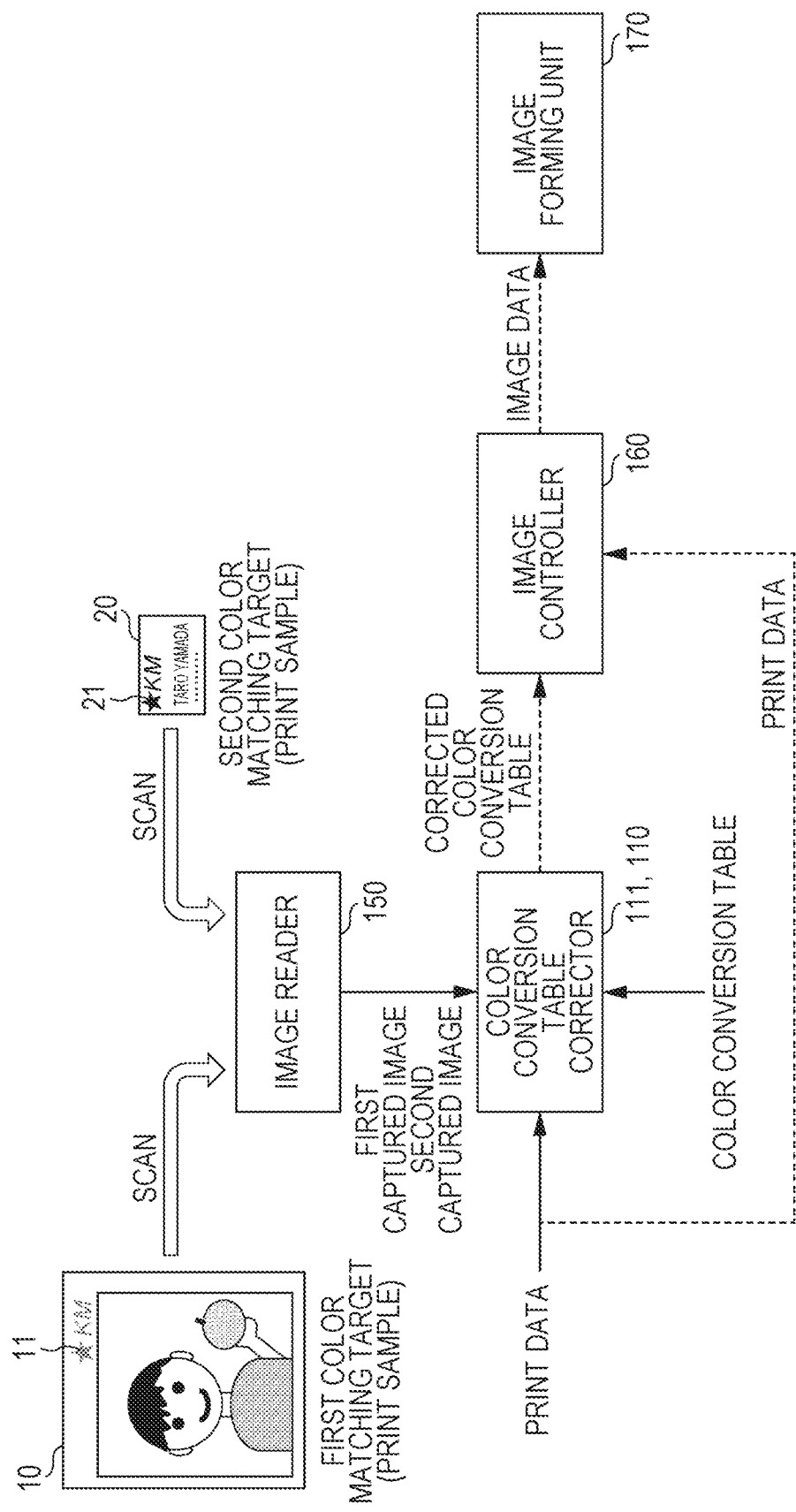
FIG. 7 is a block diagram illustrating another example of the function of the controller when correcting the color conversion table.

FIG. 7 is a block diagram illustrating another example of the function of the controller 110 in a case of correcting the color conversion table. In FIG. 7, as in FIG. 4, the image reader 150, the image controller 160, and the image forming unit 170 are also illustrated. When correcting the color conversion table, the controller 110 functions as the color conversion table corrector 111. The print sample including the image of the person, which is the first color matching target 10, includes the star and letters "KM" as the corporate color logo mark 11 corresponding to the specific area. In addition, the printed sample of a business card, which is a second color matching target 20, also includes the star mark and letters "KM" as a corporate color logo mark 21 corresponding to the specific area.

When correcting the color conversion table, the color conversion table corrector 111 obtains the first captured image by scanning the first color matching target 10 by the image reader 150. The color conversion table corrector 111 obtains the second captured image by scanning the second color matching target 20 by the image reader 150. The color conversion table corrector 111 detects an area where the first captured image and the second captured image match by pattern matching or the like, and decides the matched area as the specific area. The color conversion table corrector 111 may display the first captured image on the operation display 140, and may decide the specific area according to designation of the specific area by the user's touch on the displayed first captured image. Further, as described later, when the first color matching target 10 and the second color matching target 20 are simultaneously scanned by the image reader 150, the first captured image and the second captured image are displayed on the operation display 140 and an area where the first captured image and the second captured image match each other is shown as a specific area. Then, regarding the matched area, the color conversion table may be corrected based on the second captured image according to the user's instruction, in this case, among the images obtained by simultaneously scanning (simultaneously capturing) the first color matching target 10 and the second color matching target 20, one having a higher degree of similarity with the image data based on the print data for color matching (print image) can be determined as the first captured image. The degree of similarity can be calculated by using, for example, a known method using a histogram of brightness of each pixel.

The color conversion table corrector 111 reads the color conversion table from the storage 120. The color conversion table corrector 111 obtains the first target data by converting the first captured image using a scanner profile or the like. The color conversion table corrector Ill obtains the second target data by converting the second captured image using a scanner profile or the like. The color conversion table corrector ill obtains the print image related data (L*a*b* value) by converting the print data for color matching into image data by performing rasterization processing in the image controller 160, and then converting the data into L*a*b* values according to the source profile of the color conversion table or the like. The color conversion table corrector 111 corrects the source profile of the color conversion table for the color of the specific area based on the second target data. The color conversion table corrector 111 corrects the source profile of the color conversion table based on the print image related data and the first target data for the color of the area other than the specific area.

Figure 8:
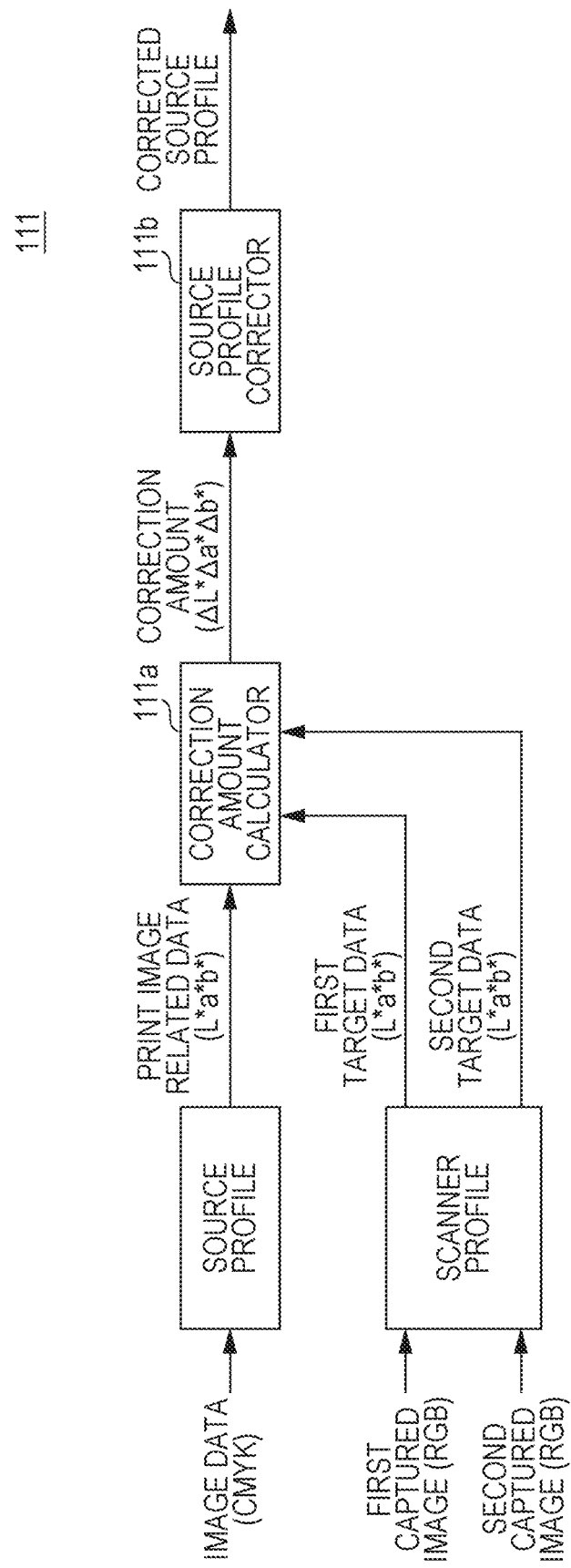
FIG. 8 is a block diagram illustrating another example of the function of the color conversion table corrector.

Correction of the color conversion table will be described in more detail with reference to FIG. 8. FIG. 8 is a block diagram illustrating another example of the function of the color conversion table corrector.

As illustrated in FIG. 8, the color conversion table corrector 111 includes a correction amount calculator 111a and a source profile corrector 111b.

The correction amount calculator 111a obtains print image related data (an L,*a*b* value) by converting the image data (CMYK values) obtained by raster zing the print data for color matching into L*a*b* values according to the source profile. The correction amount calculator 111a obtains the first target data (an L*a*b* value) by converting the first captured image (an RGB value) into an L*a*b* value according to the scanner profile or the like. The correction amount calculator 111a obtains second target data (L*a*b* value) by converting the second captured image (RGB value) into an L*a*b* value according to a scanner profile or the like. The correction amount calculator 111a calculates a difference between the print image related data (L*a*b* value) and the first target data (L*a*b* value) as a correction amount (ΔL*, Δa*, Δb*), regarding the representative color among the colors of the first target data based on the first captured image excluding the specific area. Regarding the representative color among the colors corresponding to the specific area of the second captured image, the correction amount calculator Lila calculates a difference between the print image related data (L*a*b* value) and the second target data (L*a*b* value) as the correction amount (ΔL*, Δa*, Δb*).

The source profile corrector 111b corrects the source profile of the color conversion table based on the correction amount (ΔL*, Δa*, Δb*). Specifically, the source profile can be corrected by adding the correction amount (ΔL*, Δa*, Δb*) to the L*a*b* value before correction. Note that, in the correction of the source profile, not only the points (grid) of the representative color corresponding to the color of the target data but also the adjacent points are corrected within a certain range, so that the occurrence of tone jump can be reduced. The points that are affected by a plurality of points may be averaged or the like to prevent extreme correction. Alternatively, smoothing may be performed by calculating a moving average or the like of all points.

When an image is formed, the image controller 160 reads the corrected color conversion table from the storage 120, as indicated by the arrow of the dashed line in FIG. 7. The print data included in the print job is converted to image data by being rasterized in the image controller 160, and then color-converted according to the corrected color conversion table. An image is formed on the sheet 900 by the image forming unit 170 based on the image data after the color conversion.

A method of deciding the specific area when the two color matching targets 10 and 20 are simultaneously scanned by the image reader 150 will be described in more detail.

Figure 9:
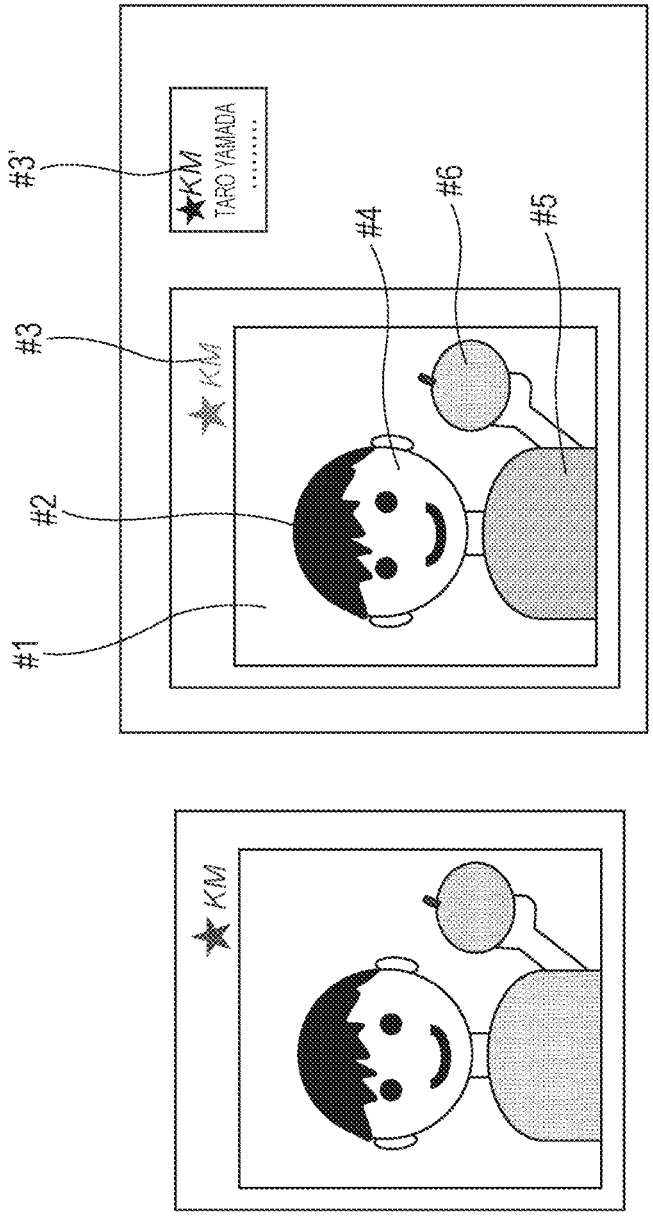
FIG. 9 is a diagram illustrating a user interface for inputting an instruction of a correction method of a color conversion table for a color of a specific area when two color matching targets are simultaneously scanned.

FIG. 9 is a diagram illustrating a user interface for inputting an instruction for the color conversion table correction method for the color of the specific area when the two color matching targets 10 and 20 are simultaneously scanned.

In the user interface, the first captured image and the second captured image are displayed, and the area where the pattern (image) matches between the first captured mage and the second captured image is indicated as a specific area with symbols including a same number ("#3" and "#3'"). Further, in order to prompt the user to instruct for the method for correcting the color conversion table for the color of the specific area, "Another target print matter is found in the area of #3. Switch to target #3'?" is displayed, along with buttons for the user to enter instructions ("Yes" and "No"). An image of image data based on the print data for color matching is also displayed.

When the user selects the "Yes" button, the color conversion table is corrected based on the second captured image for the color of the area where the first captured image and the second captured image match with each other.

The operation of the image forming apparatus 100 will be described.

Figure 10:
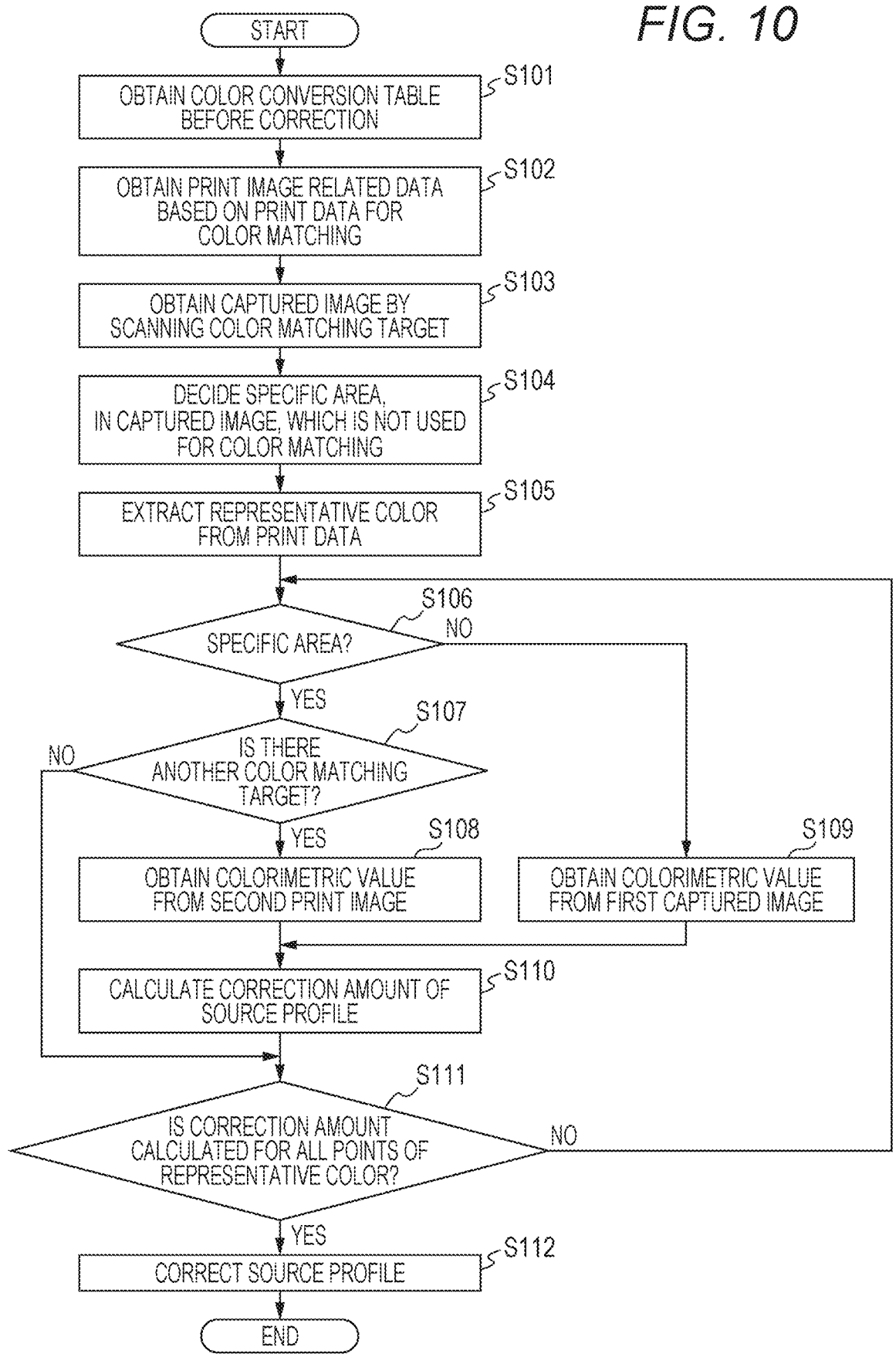
FIG. 10 is a flowchart illustrating the operation of the image forming apparatus.

FIG. 10 is a flowchart illustrating operation of the image forming apparatus 100. This flowchart can be executed by the controller 110 according to a program stored in the storage 120.

The controller 110 obtains the color conversion table before correction by reading from the storage 120 (S101).

The controller 110 obtains print image related data (L*a*b* value) by obtaining the print data for color matching, converting the data into image data (CMYK values) by rasterizing in the image controller 160, and then converting the data into L*a*b* values according to the source profile of the color conversion table (S102). The print data for color matching can be obtained by being read from the storage 120. The print data for color matching may be obtained by being received by a communication unit 130 from a terminal (not illustrated) via a network.

The controller 110 obtains the first captured image by scanning the first color matching target 10 with the image reader 150 (S103). When there are two color matching targets (first color matching target 10, second color matching target 20), the controller 110 obtains the first captured image and the second captured image by scanning the first color matching target 10 and the second color matching target 20, respectively, or at the same time.

The controller 110 decides the specific area in the first captured image (S104).

The controller 110 extracts representative colors used in the image of the print data from print data for color matching (S105).

The following steps S106 to S111 are processing for each extracted representative color.

The controller 110 determines whether the representative color is the color of the specific area (S106).

When determining that the representative color is not the color of the specific area (S106: NO), the controller 110 obtains the first target data which is a colorimetric value (L*a*b* value) by converting the first captured image (RGB) with a scanner profile or the like (S109).

When determining that the representative color is the color of the specific area (S106: YES), the controller 110 determines whether there is the second color matching target 20 which is another color matching target (S107). The controller 110 can determine that there is the second color matching target 20 based on the recognition of two captured images (first captured image and second captured image) in the captured image Obtained in step S103.

When determining that there is no other color matching target (S107: NO), the controller 110 executes the process of step S111. In this case, correction is not performed on the source profile of the color conversion table for the color of the specific area.

When determining that there is another color matching target (S107: YES), the controller 110 obtains the second target data (L*a*b* value) which is a colorimetric value by converting the second color matching target which is another color matching target using the scanner profile or the like (S108).

The controller 110 calculates a difference between the L*a*b* value corresponding to the color other than the specific area and the first target data (L*a*b* value) in the source profile of the color conversion table before correction, as a correction amount (S110). The controller 110 calculates a difference between the L*a*b* value corresponding to the color of the specific area and the second target data (L*a*b* value) in the source profile of the color conversion table before correction, as a correction amount (S110).

The controller 110 determines whether or not the correction amount has been calculated for all points of the representative colors (S111). When determining that the correction amount has not been calculated for all the points of the representative colors (S111: NO), the controller 110 returns to step S106 and continues the process.

When determining that the correction amount has been calculated for all the points of the representative colors (S111: YES), the controller 110 corrects the color conversion table based on the correction amount (S112).

There are the following effects of the embodiment.

Target data is obtained based on a captured image of a color matching target corresponding to a print image, a specific area, in the captured image, which is not used for correction of a color conversion table is decided, and the color conversion table is corrected based on data related to the print image and the target data other than the specific area. With this configuration, reduction in color reproducibility can be suppressed without reducing productivity.

Further, another piece of target data regarding the color of the another color matching target is obtained and for the color corresponding to the specific area, the color conversion table is corrected based on the print image related data and the another piece of the target data. As a result, it is possible to improve the color matching accuracy for a color such as a corporate color that requires particularly color matching accuracy.

Further, another target data is obtained based on the captured image obtained by capturing another color matching target. With this configuration, the color matching accuracy can be improved more easily.

Further, the same camera is used for capturing an image of the color matching target and for capturing an image of another color matching targets. With this configuration, reduction in color reproducibility can be effectively suppressed.

Further, the color matching target and another color matching target are simultaneously photographed.

With this configuration, color reproducibility can be improved more easily.

Further, of the two images obtained captured by the same camera, the one having a higher similarity with the print image is determined as a captured image of the color matching target, and the one having a lower similarity with the print image is determined as a captured image of another color matching target. With this configuration, the color matching, accuracy can be improved without giving an instruction for distinguishing the two images.

Further, a captured image of the color matching target is displayed, and the specific area is decided based on the designation of the specific area received from the user. With this configuration, the specific area can be designated easily and accurately.

Furthermore, in the captured image of the color matching target, an area similar to the captured image of the another color matching target is decided as the specific area so that the area other than color matching in the specific area can be performed based on the color matching target without designating the specific area and color matching in the specific area can be performed based on the another specific area.

When the color conversion table is the device profile, only the source profile is corrected in the correction of the color conversion table. Thus, by sharing the corrected source profile with each model of the image forming apparatus, the color conversion table does not have to be corrected for each model.

The present invention is not limited to the above embodiment.

For example, in the embodiment, the sheet has been described as an example of a recording medium, but the recording medium is not limited to the paper and may be a resin film or the like.

Further, the color forming the specific area is not limited to a single color, and may be a plurality of colors.

Further, in the above-mentioned flowchart, some steps may be omitted and other steps may be added. Also, some of the steps may be executed simultaneously, or one step may be divided into a plurality of steps and executed.

Further, the means and method for performing various processes in the color conversion table corrector described above can be realized by either a dedicated hardware circuit or a programmed computer. The above program may be provided by a computer-readable recording medium such as a USB memory or a digital versatile disc (DVD)-ROM, or may be provided online via a network such as the Internet, in this case, the program recorded on the computer-readable recording medium is usually transferred to and stored in a storage such as a hard disk. Further, the above program may be provided as independent application software, or may be incorporated as one function into software of the device such as the detector.

Although embodiments of the present invention have been described and illustrated in detail, the disclosed embodiments are made for purposes of illustration and example only and not limitation. The scope of the present invention should be interpreted by terms of the appended claims.

What is claimed is:

1. A color conversion table corrector that corrects a color conversion table used in an image data generation device, the color conversion table corrector comprising a hardware processor that:
   obtains data related to a print image;
   obtains first target data based on a first captured image obtained by capturing an image of a first color matching target corresponding to the print image;
   decides a specific area, in the first captured image, which is not used to correct the color conversion table; and
   corrects the color conversion table according to the data related to the print image and the first target data based on the first captured image excluding the specific area;
   wherein:
   the hardware processor further obtains second target data related to a color of a second color matching target,
   the second target data is obtained based on a second captured image obtained by capturing an image of the second color matching target; and
   the hardware processor judges an area where the second captured image and the first captured image are similar to each other and decides the judged area in the first captured image as the specific area.

2. The color conversion table corrector according to claim 1, wherein the hardware processor corrects the color conversion table according to the data related to the print image and the second target data, regarding the color corresponding to the specific area.

3. The color conversion table corrector according to claim 2, wherein the hardware processor obtains the second target data based on the second captured image obtained by capturing the image of the second color matching target by a camera that has obtained the first captured image by capturing the image of the first color matching target.

4. The color conversion table corrector according to claim 3, wherein the first captured image and the second captured image are obtained by the camera by capturing the images of the first color matching target and the second color matching target at the same time.

5. The color conversion table corrector according to claim 3, wherein the hardware processor further determines one of the two images obtained by capturing by the camera, which has a higher similarity with the print image, as the first captured image, and determines one of the two images, which has a lower similarity with the print image, as the second captured image.

6. The color conversion table corrector according to claim 1, wherein the hardware processor causes a display to display the first captured image and decides the specific area according to designation of the specific area received from a user.

7. A non-transitory recording medium storing a computer readable control program of a color conversion table corrector that corrects a color conversion table used in an image data generation device, a color conversion table correction program causing a computer to perform:
   (a) obtaining data related to a print image;
   (b) obtaining first target data based on a first captured image obtained by capturing an image of a first color matching target corresponding to the print image;
   (c) deciding a specific area, in the first captured image, which is not used to correct the color conversion table;
   (d) correcting the color conversion table according to the data related to the print image and the first target data based on the first captured image excluding the specific area;
   (e) obtaining second target data related to a color of a second color matching target, the second target data is obtained based on a second captured image obtained by capturing an image of the second color matching target; and
   (f) judging an area where the second captured image and the first captured image are similar to each other and decides the judged area in the first captured image as the specific area.

8. A color conversion table correction method performed in a color conversion table corrector that corrects a color conversion table used in an image data generation device, the method comprising:
   (a) obtaining data related to a print image;
   (b) obtaining first target data based on a first captured image obtained by capturing an image of a first color matching target corresponding to the print image;
   (c) deciding a specific area, in the first captured image, which is not used to correct the color conversion table; and
   (d) correcting the color conversion table according to the data related to the print image and the first target data based on the first captured image excluding the specific area;
   (e) obtaining second target data related to a color of a second color matching target, the second target data is obtained based on a second captured image obtained by capturing an image of the second color matching target; and
   (f) judging an area where the second captured image and the first captured image are similar to each other and decides the judged area in the first captured image as the specific area.

* * * * *